Jan. 20, 1953 R. O. REED 2,625,798
ADJUSTING GATE FOR FISH LADDERS
Filed Aug. 15, 1949 3 Sheets—Sheet 2
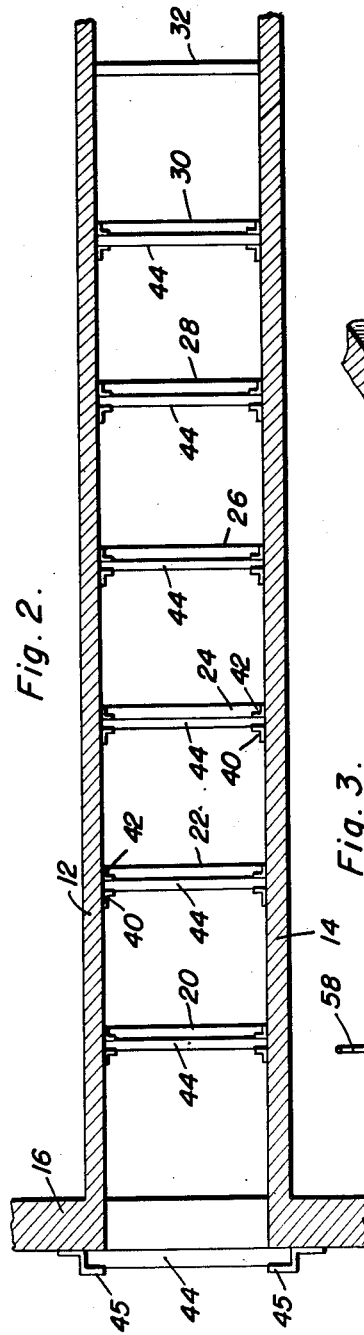
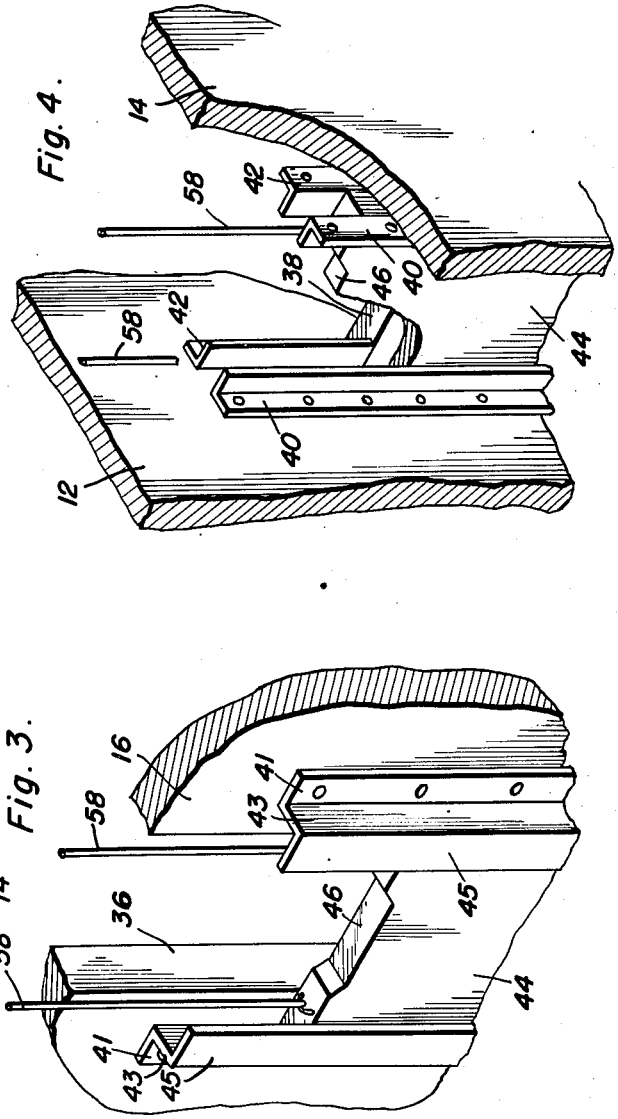
Inventor
Russell O. Reed

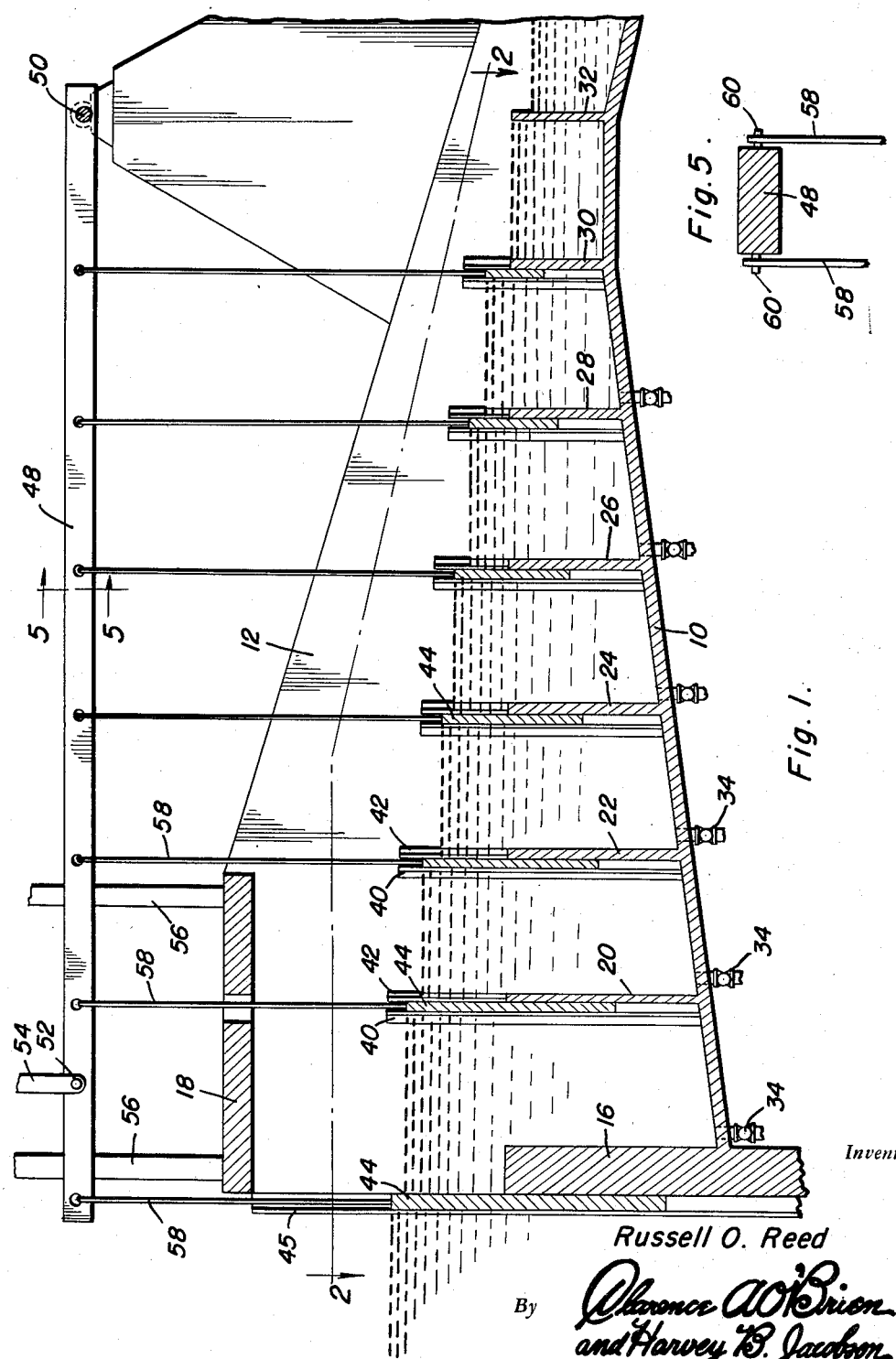

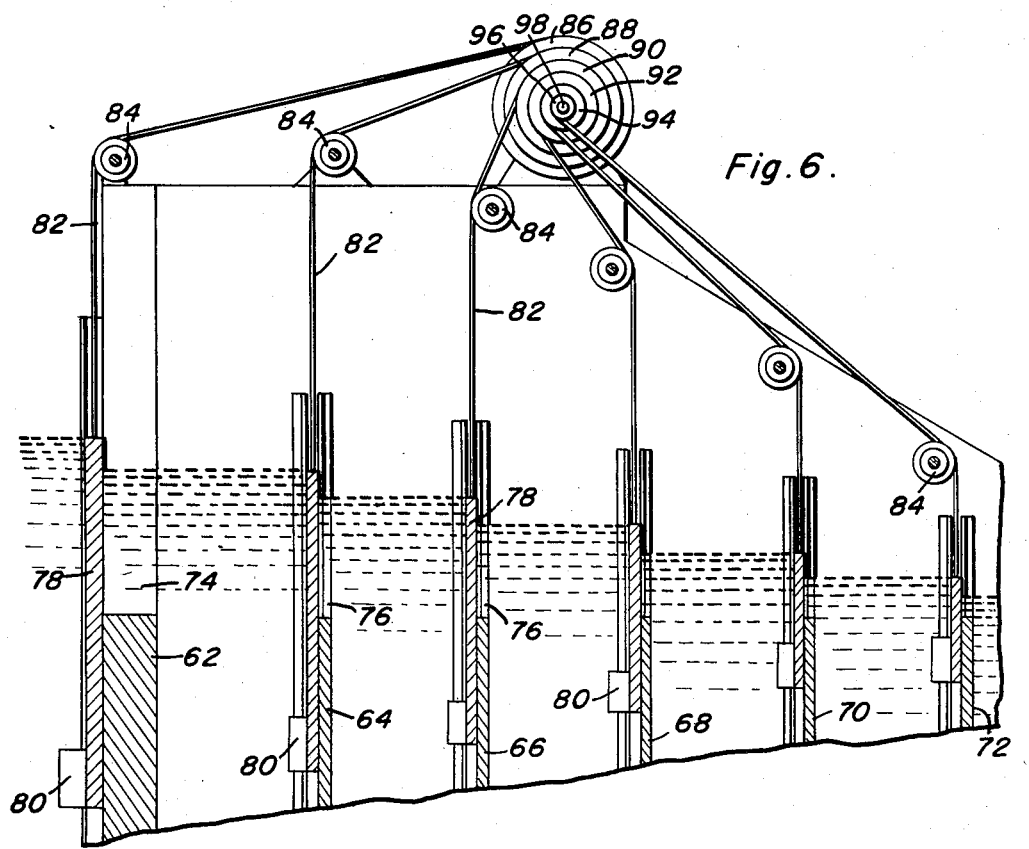
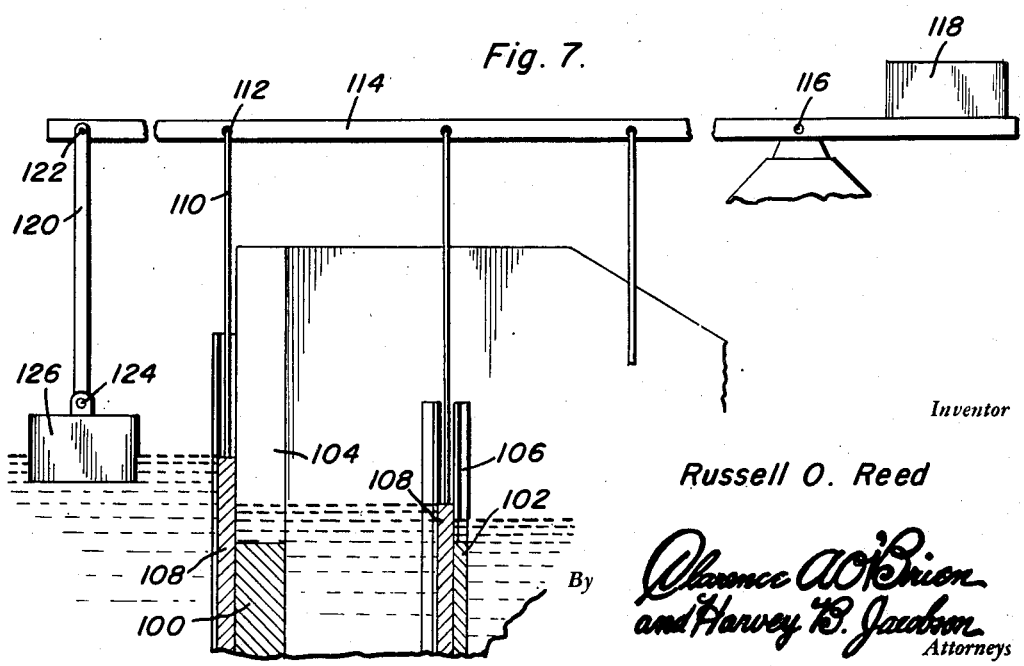

Patented Jan. 20, 1953

2,625,798

UNITED STATES PATENT OFFICE 2,625,798

ADJUSTING GATE FOR FISH LADDERS

Russell O. Reed, Estacada, Oreg., assignor of one-half to Mary E. Reed, Estacada, Oreg.

Application August 15, 1949, Serial No. 110,379

7 Claims. (Cl. 61—21)

This invention comprises novel and useful improvements in adjusting gates for fish ladders and more specifically pertains to an operating means for proportionately adjusting the plurality of gates for fish ladders either manually, by power-operated means or by a float actuating mechanism.

The principal object of this invention is to provide a fish ladder wherein the heights of the successive steps or jumps of the ladder may be simultaneously controlled in a constant proportioned ratio with respect to each other.

An additional object of the invention is to provide a fish ladder having a plurality of adjusting gates which are capable of manual operation, operation by a power means or by a float means as desired.

Still another object of the invention is to provide an adjustable gate mechanism for fish ladders wherein each gate may be independently adjusted and wherein all of the gates may be simultaneously adjusted while maintaining the same proportionate vertical spacing of the individual gates.

And a final important object to be specifically enumerated herein, is to provide a fish ladder construction as set forth in the preceding objects wherein the adjustment of the gates may be effected automatically by and in response to the level of water in the river with which the fish ladder is associated.

These, together with various ancillary features and objects of the invention which will later become apparent as the following description proceeds, are attained by the present invention, preferred embodiments of which have been illustrated by way of example only in the accompanying drawings, wherein:

Figure 1 is a central vertical longitudinal sectional view through a fish ladder in which the features of the present invention have been incorporated;

Figure 2 is a horizontal sectional view of the embodiment of Figure 1 taken substantially upon the plane of the broken section line 2—2 of Figure 1;

Figure 3 is a fragmentary perspective detail view of the upper portion of the topmost gate of the fish ladder, the construction of the gate, its slide guiding means and its actuating means being indicated therein;

Figure 4 is a view similar to Figure 3, but showing the construction of the upper portion of the other gates of the series of gates of the fish ladder;

Figure 5 is a vertical transverse sectional detail view taken substantially upon the plane of the section line 5—5 of Figure 1 and showing the mounting of the connecting means on the control beam of the device;

Figure 6 is a fragmentary sectional view similar to Figure 1 but showing a modified construction of gate operating means wherein a power operating device for controlling the gates is utilized; and Figure 7 is a fragmentary vertical sectional view similar to Figure 1 but showing a still further modified control means wherein a level responsive float is employed to actuate the control means of the gates.

Referring now more specifically to the accompanying drawings, wherein like numerals designate similar parts throughout the various views, and particularly to the embodiment of Figures 1–5, it will be seen that there has been indicated a fish ladder which is in the form of a chute having a bottom wall 10, a pair of side walls 12 and 14, and an end wall 16 which may form a part of or be connected with a dam or the like and which constitutes the upstream end of the fish ladder. At the upstream end of the chute, the side walls 12 and 14 may conveniently be bridged by a top plate 18. At longitudinally spaced intervals along its length, there are provided a plurality of parallel vertically extending partitions 20, 22, 24, 26, 28, 30 and 32, any desired number of these partitions being provided which extend between the side walls 12 and 14 and which may terminate conveniently at evenly spaced different vertical positions to thus provide a plurality of boxes in the fish ladder, each of which may be provided with a drain valve of any convenient construction indicated generally by the numeral 34 whereby the contents of that box may be drained off for cleaning or the like as desired.

Preferably, the partitions 22 are open at their upper ends, and upon their upper edges and intermediate the sides thereof are provided with vertical disposed notches forming openings or gateways through which it is intended that the fish shall pass in their passage through the fish ladder. The partition member 16 or front wall is provided with such a notch indicated at 36 in Figure 3, and one of the intermediate partitions such as that indicated at 24 and shown in Figure 4 is likewise provided with a notched portion 38, it being understood that each of the partitions has a notch similar to 38 and these notches are all in longitudinal alignment to define a passage through the partitions of the fish ladder.

Each of the partitions on opposite sides of the notches forming the gateways or fish openings therethrough is provided with channel members which constitute guides or slideways. These channel members may conveniently comprise angle iron members 40 which are secured to the side walls 12 and 14, in longitudinally spaced relation and parallel to the forward or upstream surface of the partitions, and other angle iron members 42 which are secured to the side walls and are positioned upon the top of the partitions. A series of gates which may be of identical construction, are disposed in the guideways as shown in Figures 3 and 4 for guided vertical sliding movement therein. These gates, each indicated by the numeral 44, may conveniently consist of flat plates which at their upper edges are provided with depressed notches 46.

It will now be apparent that when the gates 44 are raised, the water flowing through the fish ladder will be regulated at a predetermined level in each of the boxes, and thus provide a series of locks which, in their entirety, provide a progressive series of levels enabling fish to travel upstream and thus pass a dam or the like and thus proceed to the spawning grounds of the fish in a manner well understood in the art.

The essential feature of this invention resides in a mechanism for regulating the height of the gates so that the same may be accurately controlled and adjusted in accordance with varying conditions pertaining to the waterway with which the fish ladder is associated, and whereby despite varying differences in the levels at the upper and lower end of the ladder, the series of steps provided shall be always at a fixed proportion of the total drop of the ladder. For this purpose, there may be conveniently provided a control beam 48 which is pivoted at one end as at 50 for swinging movement in a vertical plane about this pivot, the beam at any convenient point being pivotally connected as at 52 to a control rod 54 whereby the same may be raised or lowered as desired.

As shown in Figure 1, the horizontal top plate 18 of the fish ladder may be provided with upstanding members 56 which constitute guides for the oscillating beam 48 and may support a platform to carry an operating mechanism for the rod 54.

Each of the gates 44 is connected by a pair of connecting members 58 which may comprise rods, cables or the like, and by means of which opposite sides of the gates 44 are connected to pivot pin 60 on opposite sides of the beam 48. It is evident that the spacing longitudinally of the beam of the pivot 60, as well as the spacing between the partitions of the fish ladder may be so chosen as to impart any desired proportionate vertical movement to the different gates as the beam 48 is oscillated about its pivot 50. Preferably, the partitions are equidistantly spaced as are the pivot pins 60 on the beam 48 so that the plurality of gates are varied in their movement by the same amount. Thus, each of the steps of the fish ladder are of the same vertical amplitude.

By the foregoing it will be seen that when the level of the waterway varies, so that the overall drop of the fish ladder is varied, this drop is likewise varied in the series of steps by adjusting the beam 48 so that the topmost step coincides with the upper level of the stream, and so that the distance between the upper and lower levels of the stream at the opposite ends of the ladder is proportionately broken into a number of evenly spaced steps.

Obviously, the rod 54 may be operated manually in any desired manner for synchroniously and simultaneously adjusting the series of gates. It is, of course, understood that individual gates may be individually adjusted as desired by merely shortening or lengthening the individual connecting members 58.

As shown in Figure 6, the foregoing principles of construction of the invention may be employed in a modified form in an assembly in which power means are provided for raising the series of gates, such as where very large gates are provided which it is impractical or undesirable to operate manually. In this event, the fish ladder including the end wall at the upper end of the ladder 62, and the individual partitions 64, 66, 68, 70 and 72, together with their gateways 74 and the uppermost partitions 62 and 76 and the other partitions, together with the gates 78 for each of the partitions, are of identical construction with the corresponding elements of Figure 1, including the guideways for the same. However, instead of the swinging beam together with the pair of connecting means for each of the gates, there may be conveniently provided weight members 80 disposed upon each of the gates 74 for thereby urging the same into their lowermost position, together with a cable means 82 for each gate. Each of these cables 82 is entrained over a guide pulley 84, and these cables are then entrained over a series of drums 86, 88, 90, 92, 94 and 96, each fixedly secured to a power operated rotatable shaft 98 mounted in any desired manner above the fish ladder. These drums are of different diameter, and the variation in diameter of each of the drums is such as to vary the vertical lift of each of the gates by the same amount upon a given rotation of the axle 98 by any suitable power means not shown.

Therefore, as in the preceding embodiment, the gates are given a proportionate movement in synchronization so that the topmost gate may be adjusted in accordance with the level of the waterway with which the fish ladder is associated, and each of the other gates will be varied proportionately.

A still further arrangement is illustrated in Figure 7 wherein an identical construction of fish ladder is employed including an upper partition 100 and a plurality of intermediate partitions, one of which is shown at 102, these partitions having gateways 104 and 106, respectively, which are controlled by gates 108.

As in the embodiment of Figure 1, each of the gates 108 is connected by a pair of connecting members 110 which may comprise rods or cables as desired, these connecting members being secured to pivot pins 112 on opposite sides of a vertically pivoting operating beam 114, fulcrumed as at 116 to any suitable support. This beam is provided with a counterweight 118 at one end thereof, and an operating means consisting of a rod 120 is pivoted as at 122 to the other end of the beam, this rod being pivoted as at 124 at its lower extremity to a float 126. If desired, the length of the rod 120 can be adjustable so as to vary the position of the horizontal beam 114 with respect to the float and the water level, while the counterweight 118 could likewise be adjusted longitudinally of the beam as desired. In this embodiment, it will thus be seen that as the level of the waterway varies, the float will also vary the adjustment of the gates 108, so that the topmost gate will always substantially coincide with the level of the waterway, and the series of gates will proportionately divide the drop of the fish ladder evenly between the same to make even steps by means of which the fish may readily mount the fish ladder.

It should be here noted that the top opening of the fish ladder, where the water first enters, is always at the level of the water and never submerged. This is very important, making it possible for small fish to find and use the ladder in going down stream to the sea.

Moreover, the beam 48 and the drums of Figure 6 could be manually operated if desired.

From the foregoing, the construction and operation of the invention will be readily understood and further explanation is believed to be unnecessary. However, since numerous modifications and changes will readily occur to those skilled in the art after a consideration of the foregoing specification and accompanying drawings, it is not desired to limit the invention to the exact constructions shown and described, but all suitable modifications and equivalents may be resorted to, falling within the scope of the appended claims.

Having described the invention, what is claimed as new is:

1. An adjustable gate construction for fish ladders having a plurality of longitudinally spaced vertical partitions with gate openings therethrough for the passage of fish comprising; guides on each partition, a gate having a spillway and being slidably mounted in said guides and vertically movable to adjust the overflow level of said spillway, a control means for simultaneously moving all of said gates through proportionate distances relative to each other and connecting means for attaching each gate to said control means.

2. An adjustable gate construction for fish ladders having a plurality of longitudinally spaced vertical partitions with gate openings therethrough for the passage of fish comprising; guides on each partition, a gate having a spillway and being slidably mounted in said guides and vertically movable to adjust the overflow level of said spillway, a control means disposed above said gates and partitions for simultaneously moving all of said gates through proportionate distances relative to each other and connecting mean for attaching each gate to said control means, said guides comprising a pair of channel members on each partition on opposite sides of the opening therein.

3. An adjustable gate construction for fish ladders having a plurality of longitudinally spaced vertical partitions with gate openings therethrough for the passage of fish comprising; guides on each partition, a gate slidably mounted in said guides and vertically movable to adjust the overflow level of said openings, a control means for simultaneously moving all of said gates through proportionate distances relative to each other and connecting means for attaching each gate to said control means, said control means comprising a beam having a pivot, means for causing swinging movement of said beam at longitudinally spaced positions thereon.

4. An adjustable gate construction for fish ladders having a plurality of longitudinally spaced vertical partitions with gate openings therethrough for the passage of fish comprising; guides on each partition, a gate slidably mounted in said guides and vertically movable to adjust the overflow level of said openings, a control means for simultaneously moving all of said gates through proportionate distances relative to each other and connecting means for attaching each gate to said control means, said control means comprising a beam having a pivot, means for causing swinging movement of said beam at longitudinally spaced positions thereon, an actuator for said control means, said actuator including a float and means fastening said float to said beam.

5. An adjustable gate construction for fish ladders having a plurality of longitudinally spaced vertical partitions with gate openings therethrough for the passage of fish comprising; guides on each partition, a gate slidably mounted in said guides and vertically movable to adjust the overflow level of said openings, a control means for simultaneously moving all of said gates through proportionate distances relative to each other and connecting means for attaching each gate to said control means, said control means comprising a beam having a pivot, means for causing swinging movement of said beam at longitudinally spaced positions thereon, an actuator for said control means, said actuator including a float and means fastening said float to said beam, said beam having a counterbalance.

6. An adjustable gate construction for fish ladders having a plurality of longitudinally spaced vertical partitions with gate openings therethrough for the passage of fish comprising; guides on each partition, a gate having a spillway and being slidably mounted in said guides and vertically movable to adjust the overflow level of said spillway, a control means disposed above said gates and partitions for simultaneously moving all of said gates through proportionate distances relative to each other and connecting means for attaching each gate to said control means, said control means comprising a rotatable shaft, a plurality of drums of different diameters secured to said shaft, said connecting means comprising a cable attaching each drum to one of said gates.

7. The combination of claim 2 wherein said connecting means comprises a flexible member connected to each gate and to said control means and guides for said flexible members.

RUSSELL O. REED.

REFERENCES CITED

The following references are of record in the file of this patent:

UNITED STATES PATENTS

| Number | Name | Date |
|---|---|---|
| 1,046,964 | Burkholder | Dec. 10, 1912 |
| 1,621,170 | Landan | Mar. 15, 1927 |
| 1,863,680 | Young | June 21, 1930 |